(No Model.)

F. W. COLLINS.
ATTACHMENT FOR ENGINE INDICATORS.

No. 533,633.  Patented Feb. 5, 1895.

Witnesses
Harry L. Amer
J. B. Owens

Inventor
Frank W. Collins.
By his Attorneys,
C. A. Snow & Co.

UNITED STATES PATENT OFFICE.

FRANK W. COLLINS, OF HASTINGS, MICHIGAN.

ATTACHMENT FOR ENGINE-INDICATORS.

SPECIFICATION forming part of Letters Patent No. 533,633, dated February 5, 1895.

Application filed March 29, 1894. Serial No. 505,591. (No model.)

*To all whom it may concern:*

Be it known that I, FRANK W. COLLINS, a citizen of the United States, residing at Hastings, in the county of Barry and State of Michigan, have invented a new and useful Attachment for Engine-Indicators, of which the following is a specification.

The invention relates to an improvement in those attachments for indicators which are provided to reduce the movements of the piston so that they will be of an extent which can be readily recorded by the engine indicator; and the primary object of the invention is to provide improved means for attaching the device to the engine, so that it will not interfere with the operations of the engine and not necessitate "tapping" or drilling the frame to effect the attachment.

Other objects are contemplated, such as improvements in the construction of the motion reducing mechanism, whereby the operation will be prompter and more regular than ordinarily; and the attainment of all will be apparent upon an understanding of the invention.

Figure 1:
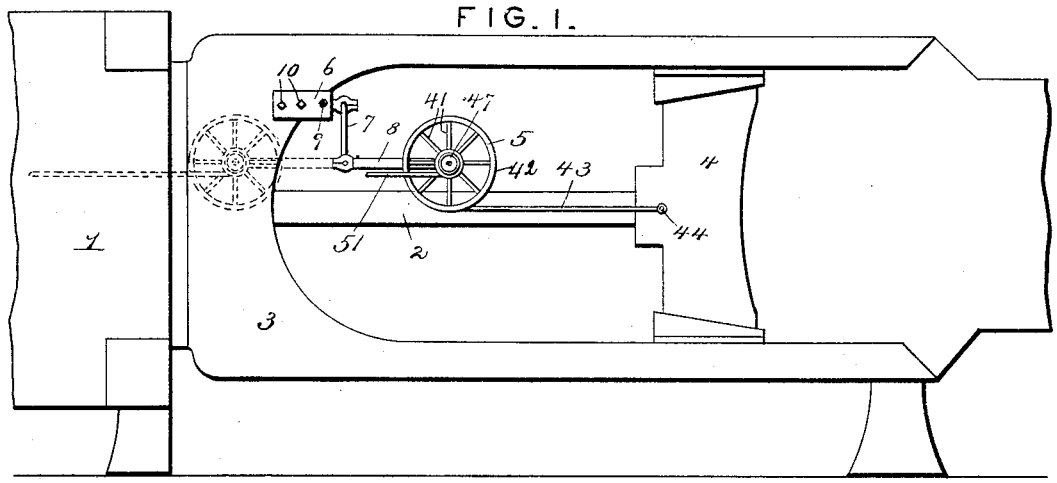
Figure 2:
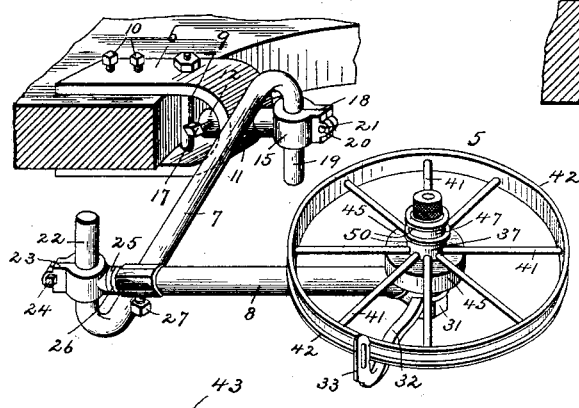
Figure 4:
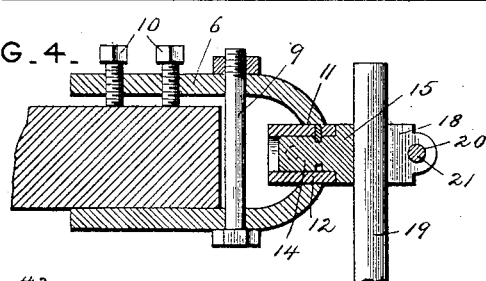
Figure 6:
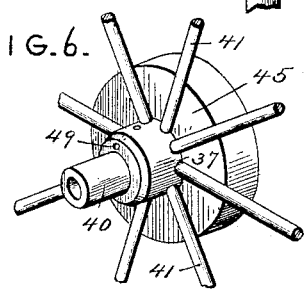
Figures 3, 5:
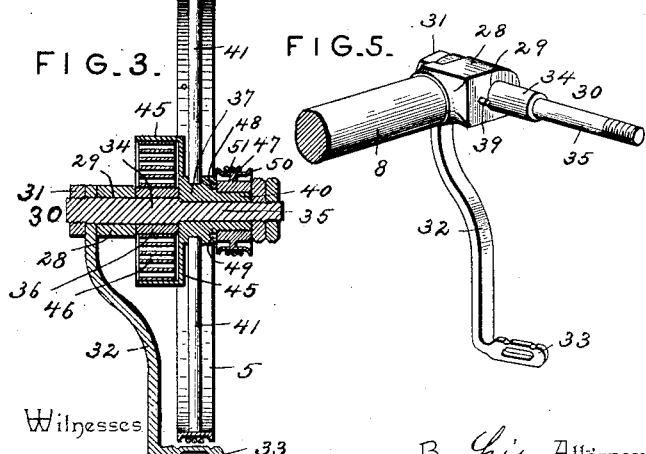
Figure 7:
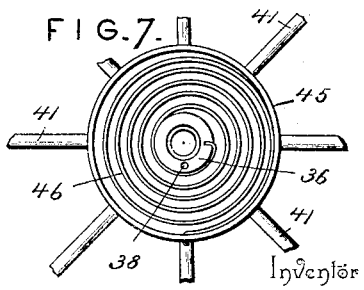

In the accompanying drawings: Figure 1 represents a plan view of an engine cylinder and frame having my improvements applied; Fig. 2, an enlarged perspective view of the device detached from the engine; Fig. 3, a cross section taken through the axle of the reducing wheel; Fig. 4, a section taken through the device for attaching the appliance to the engine frame; Fig. 5, a detail perspective of the spindle for mounting the reducing wheel; Fig. 6, a similar view of the hub of such wheel; Fig. 7, a view showing the attachment of the spring to the said wheel.

The reference numeral 1 indicates the cylinder of the engine, to which I have shown my invention applied; 2, the piston rod, and 3 the frame, in which the cross head 4 reciprocates as usual.

My improvements consist of four principal parts; the reducing wheel 5, the clip 6 and the rods 7 and 8. The clip 6 is formed of a U-shaped frame provided at one end with the bolt 9 which passes from one arm to the other and which operates to prevent spreading of the arms when under pressure. 10 indicates two set screws, which pass through one arm of the clip 6, and are adapted to engage the frame 3, thus securing it in place.

Formed in the point on the clip 6 where the arms meet is the opening 11, in which is immovably secured the sleeve 12. In this sleeve the shank 14 of the clamp 15 is arranged so as to be capable of a rotary movement therein, and the shank may be secured rigid in its sleeve, so as to be incapable of any such movement, by means of the set screw 17, which passes through the sleeve and into engagement with the shank.

The clamp 15 consists of a body or main portion having two arms 18 formed therein, which arms are formed with a slight spring tendency and adapted to embrace the bent portion 19 of the rod 7. The arms 18 are provided at their ends with the openings 20, in which the set screw 21 operates, and by this means they are made to engage the part 19 of the rod 7 and hold the same immovably in place. Thus the rod 7 is connected to the engine frame and may be adjusted to any angle to suit the conditions under which it operates.

The rod 7 extends horizontally from the clip or clamp 6 to a point near the vertical line of the piston rod 2, and is there bent upwardly to form the arm 22 which is embraced by the spring arms 23 of the rod 8. The arms 23 are formed with semicircular curved portions, adapted for the reception of the rod 7, and are provided with the set screw 24 whereby they are clamped there-against. Thus the rods 7 and 8 are connected to each other so as to be adjustable at any position when desired. The arms 23 are formed integral with the shank 25, which is reduced in size and which fits into the axial opening 26 formed in the rod 8, a set screw 27 being provided whereby the shank is held rigid, though it may be adjusted in its seat, as will readily appear.

The remaining end of the rod 8 is provided with a head 28 which is in turn provided with a transversely extending opening 29. Through this opening the spindle 30 passes and is secured immovably therein. The left hand end of the spindle 30 projects but a slight distance beyond the head 28, and is provided with a nut 31 which operates to hold in place the cord guiding arm 32. This arm, 32, projects out approximately at right angles to the spindle 30, and is formed with a laterally extending lug 33, which is slotted to permit the passage of the cord, as will be more fully described hereinafter. The right hand end of spindle 30 projects quite a distance beyond the head 28, and is formed with two different degrees of thickness, 34 and 35, arranged axially co-incident, and upon which the collar 36 and the hub 37 of wheel 5 are respectively mounted.

The collar 36 fits rotatably over the part 34 of the spindle 30, and is provided with a recess 38 (see Fig. 7), which is adapted for the reception of the pin 39 of the head 28. (See Fig. 5.) By this means the collar 36 is secured on the spindle so as to be incapable of rotary movement. I regard this as the most efficient and desirable plan of effecting this securing, but it will be understood that any of the numerous devices known to the art could be used with, perhaps, equal facility. The hub 37 of the wheel 5 is elongated laterally to form a boss or sleeve 40, which embraces the part 35 of the spindle 30 as shown. Secured to the hub 37 are the spokes 41, which are in turn secured to the flanged rim 42. Over the rim 42 the cross-head cord 43 is wound, and this extends through the slot of lug 33, and thence to the cross-head 4, to which it is connected by the ring 44.

Formed integral with or rigidly secured to the hub 37 of the wheel 5, is the casing 45, which is circular in shape and with its left hand side open as shown. In this casing the spiral spring 46 is arranged, and the outer end of this spring is connected to the inner periphery of the casing, while the inner end of the spring is connected to the collar 36 before described. The spring 46 is so disposed that the wheel 5 will be given a normal tendency from left to right, and the cord 43 is arranged on the wheel so that the spring 46 will always operate to keep it taut. Thus, as fast as the wheel 5 is rotated, by the unwinding of the cord 43, it will be rotated oppositely by the spring 46 as soon as the pressure on the cord is relaxed.

Mounted upon the sleeve 40 and capable of rotary movement thereon, is the pulley 47, which is provided at the left hand side of its hub with the stud 48, adapted to fit into one of the two openings 49 (see Figs. 3 and 6) formed on the right hand side of the hub 37, and by this means the pulley is fixed to revolve in unison with the wheel 5. The pulley 47 is provided with the flanged periphery 50, over which the indicator cord 51 is wound. From the pulley 47 the cord 51 extends to the left and to any suitable indicator, which I have not deemed necessary to show, since all versed in the art will understand it. The cord 51 is wound in a direction opposite to that of the cord 43, so that it, cord 51, will be wound on its pulley when cord 43 is unwound, and when the cord 43 is returning, under the influence of spring 46, the cord 51 will be allowed to unwind, under the influence of the indicator to which it is attached.

To use my invention, the clamp or clip 6 is secured to the upper edge of the engine frame, above the piston rod, and by means of the devices before described. The reducing wheel 5 and its attached rods 7 and 8 are then adjusted so that the wheel will be located at one side of the piston rod and with its axis disposed horizontally. The cord 43 is then attached to the cross-head 4, and the cord 51 connected to the indicator. Now, as the piston reciprocates, the wheel 5 will be rotated from right to left on the outstroke of the piston, and on the instroke in an opposite direction, under the influence of the spring 46. Thus the wheel is kept oscillating in alternate directions during the operation of the engine. While this operation is going on, the pulley 47 is similarly oscillating and causing its cord, 51, to reciprocate in unison with the same. It will be obvious, however, the length of the reciprocations of cord 51 will not be equal to the length of the reciprocations of cord 43, since the pulleys to which they are attached are of correspondingly different sizes. All of this will be fully understood, however, since the principle is common to the art of steam engineering.

By means of my invention the attachments may be applied to the engine in a much easier and more efficient manner, and without having to bore holes in the frame or otherwise injure it; also, owing to the universal mounting of wheel 5, it may be changed to any desired position, and I have shown in dotted lines in Fig. 1 how it can be placed nearer the indicator by simply swinging the rod 8 on the arm 22. The axis of the wheel 5 may also be changed to a vertical one if so desired, and this may be effected by turning the rod 8 on the shank 25. Various, indeed innumerable, other adjustments could be effected owing to the universal character of the mountings of the wheel 5, but I do not consider it necessary to describe them, since they will be apparent to any mechanic upon an examination of the mechanism.

By means of the clip 6, the device is adapted for use on all engines, and if the construction of the engine frame is such that it will not be convenient to attach the device as shown, it may be secured to any other part of the engine, owing to the capability of universal adjustment with which the arms 7 and 8 are endowed, the only essentiality being that wheel 5 be in the position shown in Fig. 1.

Having thus described my invention, what I claim as new, and desire to secure by Letters Patent, is—

1. In an appliance for reducing motion, the combination of a spindle, a wheel rotatably mounted thereon and provided on one side with a casing and on the other side with a boss, a spiral spring arranged within said casing and operating to yieldingly hold the wheel at a predetermined position, and a second wheel fixed to the boss of the first wheel, both of said wheels being adapted for the reception of cords, whereby motion may be communicated to the large wheel and reduced and transmitted from the small wheel, substantially as described.

2. In an appliance for reducing motion, the combination of a spindle, a wheel rotatably mounted thereon and having at one side a casing, a spiral spring arranged in said casing and operating to yieldingly hold the wheel at a predetermined position, and a second wheel of a diameter smaller than the first wheel, rigidly connected to said first wheel, both of said wheels being capable of connection with cords, whereby motion may be communicated to and transmitted from the wheels, substantially as described.

3. In an appliance for reducing motion, the combination of a spindle, an arm to which the spindle is rigidly connected, said arm having a stud thereon extending parallel with the spindle, a wheel rotatably mounted on the spindle and having a casing on the side adjacent to the arm, a collar encircling the spindle within the casing and having the stud of the arm received in a recess in its end, a spiral spring connected to the collar and to the interior of the casing, and a second wheel smaller than the first and connected rigidly thereto, the two wheels being capable of connection with cords whereby motion may be communicated to and transmitted from them, substantially as described.

4. In an appliance for reducing the motion of steam-engine pistons, the combination of a clamp adapted to be secured to the frame of the engine and provided with a socket, a rod having its ends bent oppositely and at right angles to the remaining portion and with one end seated in said socket, a second rod having a socket at one end adapted to receive the remaining end of the first rod, a spindle rigidly secured to the second rod, and motion-reducing mechanism mounted thereon, substantially as described.

5. In an appliance for reducing the motion of steam-engine pistons, the combination of a clamp adapted to be secured to the frame of the engine and provided with an opening, a sleeve fixed in said opening, a socket having a shank rotatably seated in said sleeve, means for securing said shank rigid within the sleeve, a rod adjustably secured within the socket aforesaid, and reducing mechanism connected to said rod, substantially as described.

In testimony that I claim the foregoing as my own I have hereto affixed my signature in the presence of two witnesses.

FRANK W. COLLINS.

Witnesses:
IRVING L. CRESSY,
JOHN G. NAGLER.